L. ROUZET.
SYNCHRONOUS MOTOR.
APPLICATION FILED JUNE 13, 1912.

1,205,937.

Patented Nov. 21, 1916.

Witnesses:

Inventor
Lucien Rouzet

UNITED STATES PATENT OFFICE.

LUCIEN ROUZET, OF LEVALLOIS-PERRET, FRANCE.

SYNCHRONOUS MOTOR.

1,205,937. Specification of Letters Patent. Patented Nov. 21, 1916.

Application filed June 13, 1912. Serial No. 703,458.

*To all whom it may concern:*

Be it known that I, LUCIEN ROUZET, a citizen of the French Republic, residing at 59 Rue Victor-Hugo, Levallois-Perret, Seine, France, have invented certain new and useful Improvements in and Relating to Synchronous Motors; and I do hereby declare the following to be a full, clear, and exact description of the invention, such as will enable others skilled in the art to which it appertains to make and use the same.

For numerous important purposes it is necessary to provide a motor which allows an absolutely synchronous velocity to be obtained, for instance for driving current rectifiers, for the drive of certain measuring apparatus and for demonstration, or again for the drive of special apparatus such for instance as the synchronous rotary spark gaps for use in wireless telegraphy etc. Up to the present these synchronous velocities have been obtained by means of synchronous motors constructed in the form of rotary converters and all these installations have involved the drawbacks incidental to these kinds of motors, that is to say, difficulties in starting, risks of accident (short circuit) in case of getting out of step, instability of action (complete stoppage in case of getting out of step).

The new result obtained by the present invention is characterized by the complete elimination of all the drawbacks just mentioned, that is to say: (1) The starting is assured without any special auxiliary device. (2) The process of getting into step is not a delicate operation and may be effected automatically. (3) The stability is more perfectly insured. Getting out of step does not cause short circuit or complete stoppage of the motor.

The method of carrying the invention into effect is characterized by providing means producing a regulating effect upon the velocity of an induction motor and allowing a synchronous velocity to be maintained between determined limits of load.

As is well known repulsion motors and those based on the same principle are provided with a commutator and with a system of short circuit brushes. The armature field, producing the motive couple results from a current developed by the displacement of the windings (a dynamical result) and from a current developed by the variations of the flux of the winding traversed by the supply current (a statical effect). The statical effect varies with the position of the short circuit brushes; it is greater the farther the brushes are set from the neutral line. The dynamical effect varies with the velocity of the moving part. If now a short circuit is produced upon the winding between points such that during the rotation all the points coincide at the same instant with the brushes on the commutator as shown by way of example at Fig. 1, it will be seen that an increase of statical effect is obtained if the short circuit is behind the brushes at the moment of maximum statical induction. Let us suppose that a motor under a certain load, is turning with its synchronous velocity; in the short circuit there will be no dynamical inductive effect whatever because it is turning of the velocity of the rotating field, but there may be a more or less important statical effect according to the position occupied in space by the winding put into short circuit at the moment of maximum induction of the primary winding. If the motor is loaded the armature tends to stop and the short circuit passes a little later under the brushes and it would seem that in this way the statical effect will be increased. The armature field will thus vary with the variations of statical effect and no longer as in the case of ordinary repulsion motors, with the variations of dynamical effect. There will therefore no longer be variations of velocity, the armature of the motor will behave like the armature of a synchronous motor and variations of load will produce an angular displacement of the movable short circuit with respect to the field.

From the preceding it will be seen that the action of the short circuit at the fixed points is to increase the statical effect proportionately to the load. Now it is well known that the motive couple does not increase proportionately with the statical effect, it follows therefore that there is a limit of load for which the motor will keep its synchronous velocity. Beyond this load the motor slackens and takes a pulsatory velocity (pumping). To insure a synchronous velocity up to a given limit of load the motor must be so constructed that, with the brushes only, working upon the commutator it tends to acquire a velocity which is not too much below the synchronous velocity. In this case the motor will insure a synchronous velocity for every load between the maximum chosen and zero. The brushes must be given an angular position nearer to the neutral line than in the case of simple repulsion motors.

It is to be observed that in a motor of this description the short circuit must not be produced when at rest, for upon starting, the armature would take up a position in which the couple is *nil*. This position is that in which the short circuit is placed symmetrically with respect to the fixed brushes of the commutator in relation to the neutral line. It is therefore necessary to so provide for starting that the short circuit is only produced when the motor has acquired a certain velocity.

In the accompanying drawings, Figure 1 is a diagrammatic view showing a motor provided with a ring armature and certain short circuiting arrangements. Fig. 2 is a diagrammatic view showing a motor arranged in accordance with this invention and provided with external rheostats in one of the short circuiting circuits and in the field circuit. Fig. 3 is a diagrammatic view showing a simple arrangement of switches in a motor constructed in accordance with this invention. Fig. 4 is a diagrammatic view showing a motor equipped with a short circuiting device arranged for closing by centrifugal force.

For a two pole field magnet, there will be two brushes 2 and $2^1$ for the commutator and the rings 3 and $3^1$ are united to two points $x$ and $x^1$ diametrically opposite upon the winding. These rings are short circuited through the brushes $3^a$ and connections $3^b$ controlled by the switch $3^c$.

Figure 1:
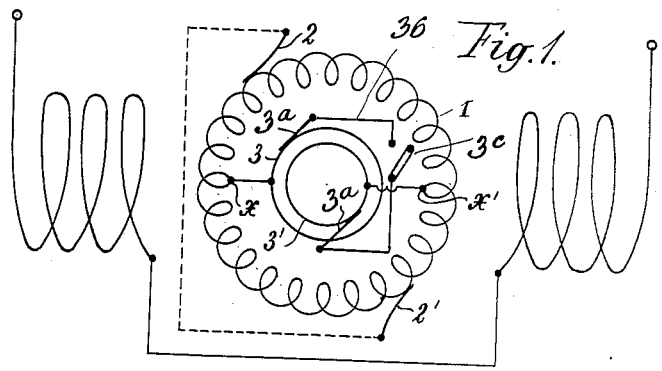
Figure 2:
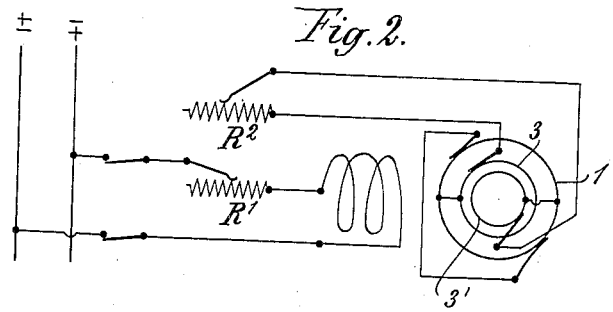
Fig. 2 shows a method of starting with rings 3 and $3^1$ put progressively into short circuit.
Figure 3:
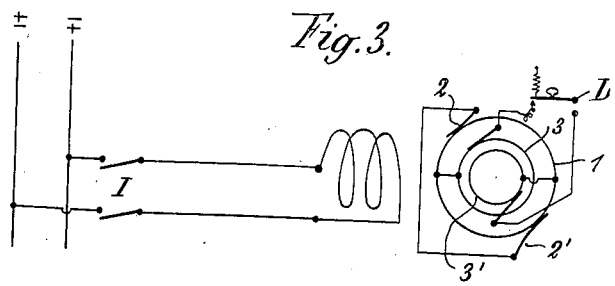
Fig. 3 illustrates a simple device for starting. The method of manipulation consists in closing successively the principal switch I and the small circuit breaker D.
Figure 4:
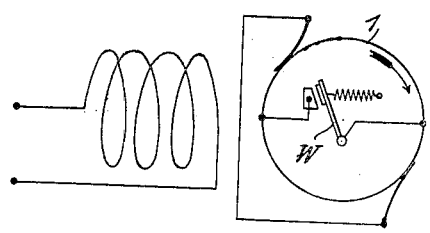

The advantageous arrangement shown at Fig. 4 is carried into practice, by mounting a switch W upon the moving part allowing the closing to be effected by the centrifugal force. The closure is effected, that is to say the short circuit is produced at a velocity slightly below that of synchronism. Getting up speed is very satisfactory in this case and this arrangement does away with the rings and their brushes and the external means for producing the short circuit.

What I claim as my invention and desire to secure by Letters Patent of the United States of America is:—

1. In a single-phase alternating current motor of the repulsion motor type having an inducing winding, an armature including a commutated armature winding, short-circuited brushes placed slightly behind the neutral axis whereby the motor tends to rotate at a speed slightly above or very close to synchronism; a pair of leads connected to electrically-diametrically-opposite fixed points on said armature winding, a fixed contact mounted on the armature and connected to one of said leads, an arm pivoted eccentrically on said armature and connected to the other of said leads, a movable contact on said arm coöperating with said fixed contact to short circuit the armature winding, and a spring arranged between said arm and armature for normally maintaining said contacts disengaged and adapted to yield and permit closing of the contacts when the armature attains a predetermined speed, said second short-circuit compelling the motor to run at synchronous speed and to maintain said speed of the motor, substantially as described.

2. In a single-phase alternating current motor of the repulsion type having an inducing winding, an armature including a commutated armature winding, short-circuited brushes placed slightly behind the neutral axis whereby the motor tends to rotate at a speed slightly above or very close to synchronism; a pair of leads connected to electrically-diametrically-opposite fixed points on said armature winding, and a switch externally located for permanently short-circuiting said points after the motor has reached a predetermined speed, this second short circuit operating to compel the motor to run at synchronous speed and to maintain said speed of the motor, substantially as described.

In testimony whereof, I affix my signature, in presence of two witnesses.

LUCIEN ROUZET.

Witnesses:
H. C. Coxe,
John Baker.